United States Patent [19]

Petri et al.

[11] 4,018,618

[45] Apr. 19, 1977

[54] MONO- AND/OR DI-ALKYL PHOSPHATES AS ADDITIVES FOR HYDRAULIC BINDERS

[75] Inventors: Rolf Petri, Frankenthal; Harry Distler, Ludwigshafen; Bertold Bechert, Hessheim, all of Germany

[73] Assignee: BASF Aktiengesellschaft, Ludwigshafen, Germany

[22] Filed: Oct. 29, 1974

[21] Appl. No.: 518,628

[30] Foreign Application Priority Data

Nov. 2, 1973 Germany .......................... 2354714

[52] U.S. Cl. .................................. 106/90; 106/104; 106/107; 106/111; 106/119; 106/314

[51] Int. Cl.² ............................................ C04B 7/02

[58] Field of Search .............. 106/85, 90, 104, 314, 106/315, 107, 111, 119

[56] References Cited

UNITED STATES PATENTS

| | | | |
|---|---|---|---|
| 2,776,901 | 1/1957 | Scripture | 106/90 |
| 2,848,340 | 8/1958 | Haldas | 106/90 |

*Primary Examiner*—J. Poer
*Attorney, Agent, or Firm*—Johnston, Keil, Thompson & Shurtleff

[57] ABSTRACT

Mono- or di-alkyl phosphate or their alkali metal salts or optionally substituted ammonium salts for use as antifoaming and hydrophobizing additives for hydraulic binders.

3 Claims, No Drawings

MONO- AND/OR DI-ALKYL PHOSPHATES AS ADDITIVES FOR HYDRAULIC BINDERS

This application discloses and claims subject matter described in German Pat. No. P 23 54 714.0, filed Nov. 2, 1973, which is incorporated herein by reference.

This invention relates to the use of specific phosphoric acid esters as additives for hydraulic binders for the purpose of imparting hydrophobic properties to said binders and of reducing the content of air pores in the building materials produced with said binders and thus of markedly increasing the end strength values of the resulting set building materials. The additives form, in the presence of calcium and magnesium ions, water-insoluble salts which are resistant to extraction and which remain stable when subjected to weathering for many years. Furthermore, the phosphoric acid esters have an antifoaming effect.

A particular advantage of the additives of the invention over other commonly used hydrophobizing agents is that their antifoaming effect reduces the amount of air pores formed when the concrete or mortar is mixed, which means that the final strength of the set material may be increased considerably thereby.

Concrete and mortar, on account of their chemical properties, are subject as inorganic building materials to attack by chemically aggressive substances. Furthermore, water can pass into and through the pores, capillaries and flaws contained in the structure of such materials. The strength and attrition resistance of the said material are also impaired by the fact that more water must be added during mixing than is required for the setting process, as otherwise the mixtures would be difficult to process (on account of poor flowability, etc.).

It is known that the plasticity of fresh concrete and fresh mortar may be increased by adding, say, wetting agents, by which means a portion of the excess mixing water may be dispensed with to give equally good processability. In this way the mixtures may be compacted more easily and more completely to give a compact structure of higher end strength values, but such concrete or mortar is still insufficiently impervious to moisture and water.

It is also known that concrete and mortar may be rendered resistant to moisture and water by the addition of specific hydrophobizing agents such as emulsions of silicon oils, paraffin, linseed oil or various synthetic resins. Mixtures of oils or fatty acids such as stearic acid, and paraffin sulfonates and emulsions of oily polyethylenes have also been used for this purpose. Finally, alkali metal salts of fatty acids such as sodium stearate have been used for this purpose in dissolved or emulsified form. The hydrophobizng action of such materials is still unsatisfactory. In addition, they introduce air into the mixture to cause, in some cases, considerable reduction of the final strength of the material, particularly the compressive and flexural tensile strengths of the said material. Finally, it is known that the addition of hydrophobizing agents to mortar or concrete influences the setting behavior thereof and this has been the cause of difficulties experienced in further processing of the hydraulically setting mixtures.

It is also known that the plasticity of fresh concrete and fresh mortar may be increased by the addition of suitable polymer dispersions with a saving in a portion of the excess mixing water giving equally good processibility. The final strength values of the set concrete or mortar are considerably increased by this method but such concrete or mortar is still not moisture-proof. If conventional hydrophobizing agents such as have been mentioned above are also added to the mortars or concrete mixtures modified with said polymer dispersions, there is an increase in the resistance of the set material to moisture and water but there is again the drawback of air-entrainment and thus of a reduction in the final strength values of the set material.

It is an object of the invention to provide hydraulic binders which have a low content of air bubbles or air pores and thus exhibit high final strength, which binders should also be extremely hydrophobic. It is another object of the invention to provide additives which may be mixed with such hydraulic binders to impart the above properties thereto.

We have now found that this object can be achieved by adding to the hydraulic binders antifoaming and hydrophobizing additives in the form of mono- or di-alkyl phosphates of the formula:

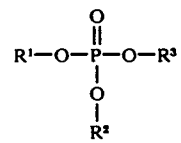

in which $R^1$ is alkyl of from 8 to 22 carbon atoms, $R^2$ is the same as $R^1$ or is hydrogen, alkali metal, ammonium or ammonium substituted by alkyl or alkanol of from 2 to 4 carbon atoms per alkyl or alkanol group, and $R^3$ is hydrogen, alkali metal, ammonium or ammonium substituted by alkyl or alkanol of from 2 to 4 carbon atoms per alkyl or alkanol group.

The manufacture of mono- or di-alkyl phosphates of the above formula is effected in known manner by transesterification of phosphoric oxychloride with fatty alcohols of the appropriate carbon chain length followed by saponification of the ester chlorides. The mono- or di-alkyl phosphates may be used both in the said form ($R^3$ and possibly also $R^2$ being hydrogen) or in the salt form, for example in the form of the sodium or potassium salt or the ammonium, alkylammonium or alkanolammonium salts, the alkyl- or alkanolammonium groups containing from 2 to 4 carbon atoms.

Particularly suitable alkanolammonium salts are di- and triethanolammonium salts. It is also possible to use mixtures of mono- and di-alkyl phosphates.

The mono- or di-alkyl phosphates (hereinafter also referred to as alkyl phosphates) which may be used in our invention, are phosphoric acid esters of $C_{8-22}$ alcohols. Particularly significant alcohols for the purposes of the invention are $C_{14-18}$ alcohols, of which palmitic and stearyl alcohols have most significance industrially.

By hydraulic binders we mean air-hardening binders, represented by gypsum anhydrite and lime, and water-hardening binders, represented by all types of cements.

The hydrophobizing and antifoaming additives of the invention may be added to such hydraulic binders together with the water when mixing the mortar or concrete. Advantageously, however, the additive may be mixed with the cement during the manufacture of the latter or with the lime during its preparation, the additives of the invention also being effective as grinding aid in, for example, cement mills. In general, the amount of mono- or di-alkyl phosphate to be used in the invention and added to the binder is from 0.1 to 15% and preferably from 0.2 to 6%, by weight of the binder.

In addition to the additives proposed by the invention, other conventional additives may be added to the hydraulic binders during mixing thereof, for example aqueous dispersions of polymers or copolymers based on ethylenically unsaturated carboxylates, for example vinyl esters such as vinyl acetate and vinyl propionate, or acrylates and methacrylates such as ethyl acrylate and n-butyl acrylate, and also polymers or copolymers based on butadiene, styrene and/or vinylidene chloride.

In other respects, the composition of a building material containing the binder, for example cement, gypsum or lime, is part of the prior art and requires no further description in this specification.

The additives of the invention now make it possible to achieve high stability against aggressive weathering influences. The content of air pores in the mortar or concrete is reduced to such an extent that the final strength values of the set material are considerably increased.

Finally, another important advantage of the use of phosphoric acid esters according to the present invention is that no undesirable substances are formed on account of the alkalinity of the binder, i.e. of cement in the concrete or lime in the mortar, that is to say, in particular, no inorganic or organic acid radicals such as acetate, propionate, chlorosulfate or nitrate ions are liberated. The additives are free from corrosive substances which could lead to corrosion of, for example, the iron metal used as reinforcement.

The invention is illustrated but not limited by the following Examples. In general, the Examples were carried out with the use of monostearyl phosphate. However, the use of other phosphates, for example distearyl phosphate or phosphates of other alcohols as defined in the invention leads to similar results.

EXAMPLE 1

100 parts of cement PZ 350 F (DIN 1164) are mixed with 1 part of monostearyl phosphate and 45 parts of water. The resulting mixture is poured into a mold and left to set for 24 hours. The specimen is removed from the mold and left in water for 6 days and then dried for 6 days at 100° C until constant weight is achieved. The specimen is then placed in water for 30 seconds or 24 hours a number of times, the amount of water absorbed being measured each time. Between each immersion the specimen is dried at 100° C for 24 hours until constant weight is achieved, this weight being equal to the original weight. The following Table lists the amounts of water absorbed in each case:

| No. | Water absorbed (in g) on immersion for: | | | |
|---|---|---|---|---|
|  | 30 sec. | 24 hrs | 30 sec. | 24 hrs |
| a | 2.9 | 13.0 | 2.5 | 8.9 |
| comparative tests |  |  |  |  |
| 1 | 7.3 | 29.6 | 6.2 | 24.5 |
| 2 | 5.0 | 26.7 | 4.9 | 22.5 |
| 3 | 7.0 | 25.6 | 6.1 | 20.3 |

The last three rows of the Table list, for comparison, results obtained using specimens prepared with 100 parts of cement PZ 350 f and 45 parts of water together with (1) no additive, (2) 1 part of zinc stearate and (3) 1 part of commercial silicon oil in emulsified form, respectively.

EXAMPLE 2

500 parts of a mixture of 500 parts of standard sand I and 1,000 parts of standard sand II are mixed with 166 parts of cement PZ 350 F and 1 part of monostearyl phosphate in 45 parts of water. Prisms measuring 4 × 4 × 16 cm are then cast from the mixture and are allowed to set in the molds for 1 day before removal and storage in water for 27 days. The prisms are then subjected to the flexural tensile test laid down in DIN 1164 and it is found that the water has penetrated to a depth of 1.5 cm in the prisms. Prisms which have been made from the same cement/sand/water mixture but without the addition of monostearyl phosphate and having the same dimensions show, under identical test conditions, complete penetration of water.

EXAMPLE 3

A concrete mixture of the following composition:

| A concrete mixture of the following composition: | Parts |
|---|---|
| sand (grain size 0.2 to 0.6 mm) | 1 |
| sand (grain size 0.6 to 0.9 mm) | 1 |
| sand (grain size 0.9 to 1.5 mm) | 2 |
| sand (grain size 1.5 to 3.0 mm) | 2 |
| sand (grain size 3.0 to 7.0 mm) | 4 |
| sand (grain size 7.0 to 15 mm) | 5 |
| sand (grain size 15 to 30 mm) | 5 |
| cement PZ 350 F | 3 | is mixed with 0.1 part of monostearyl phosphate in 2 parts of water. Cubes measuring 12 × 20 × 20 cm are cast from the mixture. The cubes are allowed to set for 1 day, are then removed from the mold stored in water for 27 days. The concrete cubes are then subjected to the water-impermeability test according to DIN 1045. On completion of the test, it is seen from the broken specimens that the greatest depth of water penetration is only 4 cm. By contrast, an untreated concrete cube shows complete water penetration under identical test conditions.

EXAMPLE 4

Prisms having the dimensions given in Example 2 are made from a mixture of 100 parts of cement PZ 350 F, 100 parts of standard sand I, 200 parts of standard sand II, 200 parts of a commercial 50% aqueous dispersion of a copolymer of butyl acrylate and styrene, 1 part of monostearyl phosphate and 45 parts of water. The prisms are removed from the molds after 24 hours and are then placed in water for 27 days. The depth to which the water has penetrated is found to be 1 cm, the flexural tensile strength being 78.2 kg/cm$^2$ and the compressive strength 473 kg/cm$^2$.

A prism measuring 4 × 4 × 16 cm and made without the addition of a polymer dispersion and without the addition of monostearyl phosphate of the invention and tested under otherwise identical conditions shows a water penetration depth of 3.2 cm, a flexural tensile strength of 79.9 kg/cm$^2$ and a compressive strength of 452 kg/cm$^2$.

A prism measuring 4 × 4 × 16 cm and made with the addition of a polymer dispersion but without the additive of the invention and tested under otherwise identical conditions shows a water penetration of 3.5 cm, a flexural tensile strength of 80.0 kg/cm² and a compressive strength of 419 kg/cm².

Table I below lists examples of the processing properties and strength values of a cement mortar with and without the addition of the monostearyl phosphate of the invention.

The composition of the test mortar was as follows:
1 part of Portland cement 350 F
1 part of standard sand I (grain size 0 to 0.2 mm)
2 parts of standard sand II (grain size 0.6 to 2 mm)
0.5 part of water (water/cement ratio 0.5).

TABLE I

| 1 | 2 | 3 | 4 | 5 | 6 | | | |
|---|---|---|---|---|---|---|---|---|
| | Amount of additive of invention added, based on cement (monostearyl phosphate) | water:cement ratio | Extent of spread [cm] | Air content [%v/v] | Flexural tensile strength after 28 days | | Compressive strength after 28 days | |
| No. | | | | | stored dry [kg/cm²] | stored wet [kg/cm²] | stored dry [kg/cm²] | stored wet [kg/cm²] |
| 1 | none | 0.5 | 13.9 | 5.2 | 68.3 | 69.1 | 383 | 449 |
| 2 | 0.1% | 0.5 | 14.7 | 4.3 | 77.1 | 75.5 | 403 | 466 |
| 3 | 0.3% | 0.5 | 14.4 | 4.4 | 80.7 | 77.9 | 398 | 476 |
| 4 | 0.5% | 0.5 | 14.6 | 4.1 | 79.9 | 72.6 | 409 | 441 |
| 5 | 1% | 0.5 | 14.9 | 3.8 | 73.8 | 76.0 | 446 | 534 |

For the purpose of comparison, Tables II and III below list examples of the processing properties and strength values of a cement mortar prepared with and without the addition of commercial hydrophobizng agents such as zinc stearate and silicon oil.

The test mortar had the following composition:
1 part of Portland cement 350 F
1 part of standard sand I (grain size 0 to 0.2 mm)
2 parts of standard sand II (grain size 0.6 to 2 mm)
0.5 part of water (water:sand ratio 0.5).

TABLE II

| 1 | 2 | 3 | 4 | 5 | 6 | | | |
|---|---|---|---|---|---|---|---|---|
| | Amount of commercial zinc stearate added, based on cement | water:cement ratio | Extent of spread [cm] | Air content [%v/v] | Flexural tensile strength after 28 days | | Compressive strength after 28 days | |
| No. | | | | | stored dry [kg/cm²] | stored wet [kg/cm²] | stored dry [kg/cm²] | stored wet [kg/cm²] |
| 1 | none | 0.5 | 13.9 | 5.4 | 68.8 | 76.1 | 353 | 461 |
| 2 | 0.1% | 0.5 | 14.5 | 6.2 | 71.8 | 71.9 | 338 | 441 |
| 3 | 0.3% | 0.5 | 14.2 | 6.1 | 77.1 | 71.7 | 343 | 407 |
| 4 | 0.5% | 0.5 | 14.0 | 6.6 | 74.4 | 65.9 | 316 | 384 |
| 5 | 1% | 0.5 | 14.5 | 6.0 | 76.5 | 61.3 | 310 | 350 |

TABLE III

| 1 | 2 | 3 | 4 | 5 | 6 | | | |
|---|---|---|---|---|---|---|---|---|
| | Amount of commercial silicon oil added, based on cement | water:cement ratio | Extent of spread [cm] | Air content [%v/v] | Flexural tensile strength after 28 days | | Compressive strength after 28 days | |
| No. | | | | | stored dry [kg/cm²] | stored wet [kg/cm²] | stored dry [kg/cm²] | stored wet [kg/cm²] |
| 1 | none | 0.5 | 13.9 | 5.4 | 78.6 | 70.8 | 336 | 414 |
| 2 | 0.1% | 0.5 | 14.0 | 6.5 | 68.6 | 74.7 | 313 | 413 |
| 3 | 0.3% | 0.5 | 14.3 | 6.5 | 76.3 | 65.4 | 314 | 393 |
| 4 | 0.5% | 0.5 | 14.4 | 6.8 | 79.3 | 63.8 | 302 | 372 |
| 5 | 1% | 0.5 | 13.3 | 7.6 | 74.4 | 66.9 | 308 | 367 |

Table IV below illustrates the use of the additive of the invention in conjunction with polymer dispersions in a cement mortar. Use is made of various dispersions showing different monomer proportions and containing different emulsifiers.

The composition of the test mortar was as follows:
1 part of Portland cement 350 F
1 part of standard sand I (grain size 0 to 0.2 mm)
2 parts of standard sand II (grain size 0.6 to 2 mm)
0.5 part of water (water:cement ratio 0.5).

The mortar was mixed in a laboratory mixer (by Ton-Industrie), mixing being carried out dry for 1 minute at setting I and wet for 1 minute also at setting I. Where polymer dispersions were added, the water contained in the dispersion is included in the amount of water calculated as mixing water. The listed amounts of dispersion added are calculated as solid polymer based on the weight of cement.

TABLE IV

| No. | Type of polymer dispersion | Solids content | Amount of dispersion (solids) added; based on cement | Amount of additive of invention added, based on cement | water:cement ratio | Extent of spread [cm] | Air content [%v/v] | Flexural tensile strength after 28 days stored dry [kg/cm²] | Flexural tensile strength after 28 days stored wet [kg/cm²] | Compressive strength after 28 days stored dry [kg/cm²] | Compressive strength after 28 days stored wet [kg/cm²] |
|---|---|---|---|---|---|---|---|---|---|---|---|
| 1 | — | — | none | — | 0.5 | 14.0 | 4.4 | 62.9 | 77.8 | 347 | 414 |
| 2 | defoamed dispersion of 1:1.2 copolymer of butyl acrylate and styrene | 50% | 10% | — | 0.4 | 14.2 | 5.4 | 109.8 | 80.0 | 475 | 419 |
|   |   |   | 10 | 0.1% | 0.4 | 14.0 | 5.6 | 96.9 | 79.9 | 453 | 429 |
|   |   |   | 10% | 0.3% | 0.4 | 14.1 | 5.5 | 108.1 | 75.5 | 473 | 430 |
|   |   |   | 10% | 0.5% | 0.4 | 14.0 | 5.3 | 103.6 | 74.7 | 460 | 441 |
|   |   |   | 10% | 1% | 0.4 | 12.0 | 5.2 | 122.8 | 75.2 | 501 | 473 |
| 3 | defoamed dispersion of 1:0.8 copolymer of vinyl propionate and vinyl chloride | 50% | 10% | — | 0.45 | 13.3 | 6.2 | 88.0 | 70.2 | 424 | 435 |
|   |   |   | 10% | 0.1% | 0.45 | 13.4 | 5.4 | 88.9 | 65.2 | 436 | 410 |
|   |   |   | 10% | 0.3% | 0.45 | 12.6 | 5.6 | 95.3 | 68.6 | 477 | 422 |
|   |   |   | 10% | 0.5% | 0.45 | 11.4 | 5.0 | 96.2 | 67.9 | 487 | 433 |
|   |   |   | 10% | 1% | 0.45 | 11.7 | 4.8 | 99.4 | 69.9 | 490 | 463 |

For the purpose of comparison, Tables V and VI below illustrate the use of commercial hydrophobizing agents in conjunction with polymer dispersions in a cement mortar. Use is made of various dispersions exhibiting different monomer proportions and containing different emulsions. The composition of the test mortar was as follows:

1 part of Portland cement 350 F
1 part of standard sand I (grain size 0 to 0.2 mm)
2 parts of standard sand II (grain size 0.6 to 2 mm)
0.5 part of water (water:cement ratio 0.5)

The mortar was mixed in a laboratory mixer (by Ton-Industrie), mixing being carried out dry for 1 minute at setting I and wet for 1 minute also at setting I. Where a polymer dispersion was added, the water contained in the dispersion is included in the amount of water calculated as mixing water. The listed amounts of added dispersion are calculated as solid polymer, based on the weight of cement.

TABLE V

| No. | Type of polymer dispersion | Solids content | Amount of dispersion (solids) added, based on cement | Amount of commercial zinc stearate added, based on cement | water:cement ratio | Extent of spread [cm] | Air content [%v/v] | Flexural tensile strength after 28 days stored dry [kg/cm²] | Flexural tensile strength after 28 days stored wet [kg/cm²] | Compressive strength after 28 days stored dry [kg/cm²] | Compressive strength after 28 days stored wet [kg/cm²] |
|---|---|---|---|---|---|---|---|---|---|---|---|
| 1 | — | — | none | — | 0.5 | 13.9 | 5.4 | 68.8 | 76.1 | 353 | 420 |
| 2 | defoamed dispersion of 1:1.2 copolymer of butyl acrylate and styrene | 50% | 10% | — | 0.4 | 14.4 | 5.6 | 97.8 | 80.2 | 446 | 404 |
|   |   |   | 10% | 0.1% | 0.4 | 14.0 | 6.0 | 99.8 | 80.2 | 440 | 404 |
|   |   |   | 10% | 0.3% | 0.4 | 13.7 | 6.0 | 87.5 | 78.5 | 437 | 405 |
|   |   |   | 10% | 0.5% | 0.4 | 12.9 | 7.0 | 94.7 | 74.2 | 437 | 386 |
|   |   |   | 10% | 1% | 0.4 | 11.9 | 7.6 | 92.5 | 67.2 | 427 | 359 |
| 3 | defoamed dispersion of 1:0.8 copolymer of vinyl propionate and vinyl chloride | 50% | 10% | — | 0.45 | 12.1 | 6.5 | 85.8 | 65.1 | 390 | 333 |
|   |   |   | 10% | 0.1% | 0.45 | 11.2 | 6.1 | 80.8 | 61.6 | 391 | 314 |
|   |   |   | 10% | 0.3% | 0.45 | 11.0 | 6.0 | 83.8 | 60.7 | 364 | 322 |
|   |   |   | 10% | 0.5% | 0.45 | 10.8 | 6.5 | 86.1 | 58.8 | 363 | 313 |
|   |   |   | 10% | 1% | 0.45 | 10.5 | 6.8 | 82.2 | 51.6 | 379 | 318 |

TABLE VI

| No. | Type of polymer dispersion | Solids content | Amount of dispersion (solids) added, based on cement | Amount of commercial silicon oil added, based on cement | water:cement ratio | Extent of spread cm | Air content %v/v | Flexural tensile strength after 28 days stored dry kg/cm² | Flexural tensile strength after 28 days stored wet kg/cm² | Compressive strength after 28 days stored dry kg/cm² | Compressive strength after 28 days stored wet kg/cm² |
|---|---|---|---|---|---|---|---|---|---|---|---|
| 1 | — | — | none | — | 0.5 | 13.9 | 5.4 | 78.6 | 70.8 | 336 | 414 |

TABLE VI-continued

| No. | Type of polymer dispersion | Solids content | Amount of dispersion (solids) added, based on cement | Amount of commercial silicon oil added, based on cement | water: cement ratio | Extent of spread cm | Air content %v/v | Flexural tensile strength after 28 days stored dry kg/cm² | Flexural tensile strength after 28 days stored wet kg/cm² | Compressive strength after 28 days stored dry kg/cm² | Compressive strength after 28 days stored wet kg/cm² |
|---|---|---|---|---|---|---|---|---|---|---|---|
| 2 | defoamed dispersion of 1:1.2 copolymer of butyl acrylate and styrene | 50% | 10% 10% 10% 10% 10% 1% | — 0.1% 0.3% 0.5% | 0.4 0.4 0.4 0.4 0.4 | 13.6 13.9 13.9 14.0 15.2 | 5.4 6.0 5.6 5.7 5.0 | 89.7 80.5 78.9 77.4 80.5 | 72.1 73.9 72.1 69.6 71.8 | 412 361 396 378 350 | 369 354 361 342 340 |
| 3 | defoamed dispersion of 1:0.8 copolymer of vinyl propionate and vinyl chloride | 50% | 10% 10% 10% 10% 10% | — 0.1% 0.3% 0.5% 1% | 0.45 0.45 0.45 0.45 0.45 | 11.0 11.7 11.2 11.4 11.8 | 5.8 5.6 5.4 6.0 6.0 | 89.7 86.7 79.3 85.9 79.6 | 58.8 55.4 58.2 59.1 53.8 | 364 339 329 358 349 | 306 294 296 283 265 |

We claim:

1. Hydraulic binders containing mono- or di-alkyl phosphates of the formula

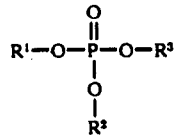

in which R¹ denotes alkyl of from 14–18 carbon atoms, R² denotes R¹ or hydrogen, alkali metal, ammonium or ammonium substituted by alkyl or alkanol of from 2 to 4 carbon atoms per alkyl or alkanol group and R³ denotes hydrogen, alkali metal, ammonium or ammonium substituted by alkyl or alkanol of from 2 to 4 carbon atoms per alkyl or alkanol group, as antifoaming and hydrophobizing agents, the amount of said phosphates being from about 0.2 to 6% by weight based on the weight of the hydraulic binder.

2. Hydraulic binders as set forth in claim 1, wherein R³ denotes a sodium or potassium atom or a di- or tri-ethanol-ammonium radical.

3. Hydraulic binders as set forth in claim 1, said binders containing monostearyl phosphate.

* * * * *